No. 744,095. Patented November 17, 1903.

UNITED STATES PATENT OFFICE.

GUY OSBORN, OF NEW YORK, N. Y., ASSIGNOR TO DE RONDE-OSBORN CO., OF NEW YORK, N. Y., A CORPORATION OF SOUTH DAKOTA.

COMPOSITION FOR REMOVING PAINT AND VARNISH.

SPECIFICATION forming part of Letters Patent No. 744,095, dated November 17, 1903.

Application filed July 20, 1903. Serial No. 166,382. (No specimens.)

*To all whom it may concern:*

Be it known that I, GUY OSBORN, a citizen of the United States, and a resident of the city, county, and State of New York, have invented a certain new and useful Composition of Matter to be Used as a Paint and Varnish Remover, of which the following is a full, clear, and exact specification.

My invention relates to a paint and varnish remover, and the formula is the following: acetone, 37.5 gallons; benzin, five gallons; benzol, five gallons; carbon disulfid, five gallons; amyl acetate, 2.5 gallons, and to the resulting mixture add three ounces of 120° paraffin to each gallon.

This remover, the component parts of which are mixed in proportions as given, is to be used in removing paint, varnish, &c., leaving the surface clean and ready for refinishing. It is applied with a brush or sponge, and as the ingredients so mixed act as a solvent for all vegetable pigments when the material is left on the varnished or painted surface for a period of two or three minutes it softens and loosens the pigment and allows the surface to be wiped clean of all varnish or paint.

Having now described my invention, what I claim as new, and desire to secure by Letters Patent, is—

1. In combination a varnish and paint remover comprising a mixture of acetone, benzol, amyl acetate and paraffin.

2. A paint and varnish remover comprising acetone, benzin, benzol, carbon disulfid, amyl acetate and paraffin, substantially as described.

3. A paint and varnish remover comprising the combination of the following ingredients: acetone 37.5 gallons, benzin five gallons, benzol five gallons, carbon disulfid five gallons, amyl acetate 2.5 gallons and three ounces 120° paraffin per gallon, substantially as described.

In witness whereof I have hereunto set my hand in presence of two witnesses.

GUY OSBORN.

Witnesses:
JEANETTE HERMAN,
CHAS. F. JABLON.